(12) United States Patent
Kundargi et al.

(10) Patent No.: US 11,178,628 B2
(45) Date of Patent: Nov. 16, 2021

(54) EFFICIENT BEAM SWEEPING AT A MOBILE DEVICE RECEIVER

(71) Applicant: National Instruments Corporation, Austin, TX (US)

(72) Inventors: Nikhil U. Kundargi, Round Rock, TX (US); Venkata Siva Santosh Ganji, Bryan, TX (US); Ahsan Aziz, Austin, TX (US); James Wesley McCoy, Leander, TX (US)

(73) Assignee: National Instruments Corporation, Austin, TX (US)

( * ) Notice: Subject to any disclaimer, the term of this patent is extended or adjusted under 35 U.S.C. 154(b) by 111 days.

(21) Appl. No.: 16/671,101

(22) Filed: Oct. 31, 2019

(65) Prior Publication Data

US 2021/0136703 A1 May 6, 2021

(51) Int. Cl.
*H04B 7/00* (2006.01)
*H04W 56/00* (2009.01)
*H04B 7/08* (2006.01)
*H04W 72/04* (2009.01)
*H04L 27/26* (2006.01)
*H04L 5/00* (2006.01)

(52) U.S. Cl.
CPC .......... *H04W 56/001* (2013.01); *H04B 7/088* (2013.01); *H04L 5/0007* (2013.01); *H04L 27/2605* (2013.01); *H04W 72/042* (2013.01)

(58) Field of Classification Search
CPC ... H04W 16/28; H04W 24/10; H04W 52/245; H04W 52/26; H04W 56/00; H04W 56/0085; H04W 56/0095; H04W 72/0413; H04W 72/085; H04W 72/1289; H04W 88/02

USPC ................................. 370/310, 328–330, 350
See application file for complete search history.

(56) References Cited

U.S. PATENT DOCUMENTS

| | | | | |
|---|---|---|---|---|
| 9,467,261 | B2 * | 10/2016 | Papasakellariou | ...... H04L 5/006 |
| 10,411,940 | B2 * | 9/2019 | Ko | ...... H04L 27/2666 |
| 10,420,036 | B2 * | 9/2019 | Gong | ...... H04B 17/318 |
| 10,470,144 | B2 * | 11/2019 | Kim | ...... H04W 56/0015 |
| 10,616,843 | B2 * | 4/2020 | Huang | ...... H04L 5/10 |

(Continued)

OTHER PUBLICATIONS

Mediatek, Beam management considerations, Aug. 2016, R1-167543, 3GPP.*
Samsung, RRM measurment in NR, Apr. 2017, R2-1703721, 3GPP.*

*Primary Examiner* — Dmitry Levitan
(74) *Attorney, Agent, or Firm* — E. Alan Davis; James W. Huffman

(57) ABSTRACT

A user equipment device (UE) reduces receive beam selection time. An antenna array forms receive beams to receive synchronization signal blocks (SSBs) transmitted by a base station (BS). Each SSB comprises OFDM symbols. Each SSB includes a BS-assigned index. The receive beams are switched in time such that, for each SSB, two or more of the receive beams are used to receive corresponding two or more mutually exclusive sets each having at least one but less than all of the OFDM symbols of the SSB. A processor is programmed to, for each receive beam/SSB index pair, measure a signal quality based on the at least one but less than all of the OFDM symbols of the indexed SSB received by the receive beam of the pair. The processor uses the measured signal qualities to select one of the receive beams to use to receive subsequent communications from the BS.

24 Claims, 10 Drawing Sheets

(56) References Cited

U.S. PATENT DOCUMENTS

| | | | |
|---|---|---|---|
| 11,071,101 B2* | 7/2021 | Seo | H04W 72/042 |
| 2018/0324678 A1* | 11/2018 | Chen | H04W 8/08 |
| 2019/0090205 A1 | 3/2019 | Gong | |
| 2020/0045569 A1* | 2/2020 | Seo | H04W 56/001 |
| 2020/0045709 A1* | 2/2020 | Seo | H04W 76/27 |
| 2020/0153672 A1* | 5/2020 | Choi | H04W 72/042 |
| 2020/0204423 A1* | 6/2020 | Atungsiri | H04B 7/0695 |
| 2020/0412590 A1* | 12/2020 | Akkarakaran | H04L 27/26136 |
| 2021/0050936 A1* | 2/2021 | Seo | H04L 5/0053 |
| 2021/0058906 A1* | 2/2021 | Seo | H04L 5/0044 |
| 2021/0144723 A1* | 5/2021 | Takahashi | H04L 5/0053 |

* cited by examiner

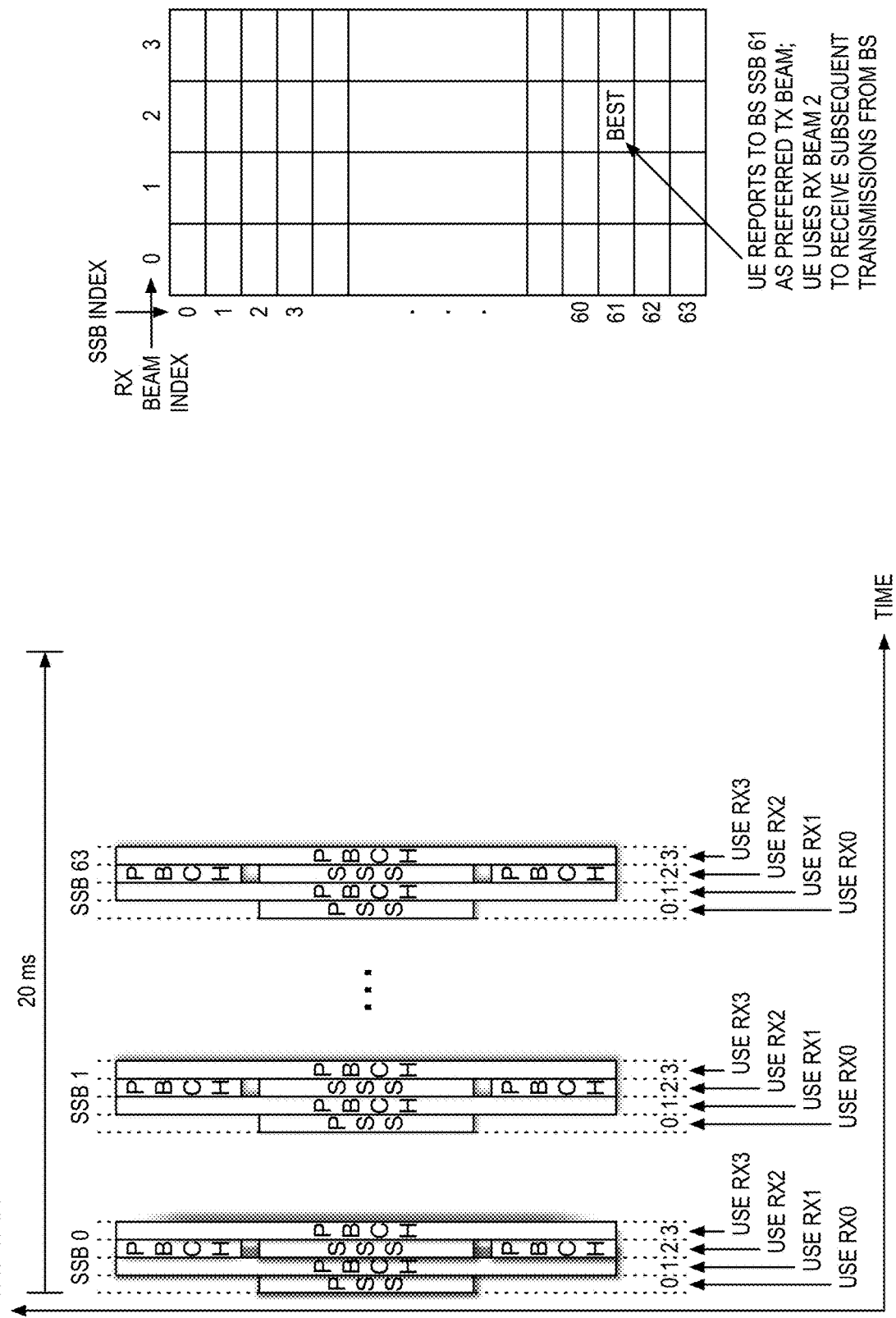

EFFICIENT BEAM SWEEPING AT A MOBILE DEVICE RECEIVER

BACKGROUND

The 5G (5th generation) mobile telecommunications system is able to span a wide variety of deployment scenarios (e.g., Rural, Urban Macro, Dense Urban, Indoor, etc.) in a flexible and scalable manner. In particular, TDD (time division duplex) air interfaces (e.g., massive MIMO reciprocity-based) such as New Radio (NR) allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC). The air interfaces may support extremely high frequencies, including in the millimeter wave (mmWave) spectrum.

The propagation characteristics of mmWave signals are such that the base station and the mobile device both need to employ beamforming using antenna arrays to accomplish sufficient coverage. Unlike traditional cellular systems, many handoffs will be performed even within a cell, only these handoffs are between beams. Herein lies a difference between 4G cellular and 5G mmWave communications: beam management. Beam management is a method for handling intracell and intercell beam handoffs. It is expected that the base station will support more than 64 beams and the mobile device up to 128 beams per antenna array, for example.

Efficient handling of handoffs between beams is important because useful communications beams have a finite lifetime. For example, under rotational channels, such as a person turning, the beams may need to change more quickly than current mechanisms support. Hence, there is a need for more rapid beam management mechanisms. Furthermore, it is expected that the antenna arrays in 5G will employ both wide and narrow beams and thus will have a nested structure in which a handful of narrow beams cover the same angular space as a single wide beam. The wide beam has less antenna gain.

BRIEF SUMMARY

In one aspect the present invention provides a method for reducing receive beam selection time by a user equipment device (UE). The UE is configured to beamform receive beams to receive synchronization signal blocks (SSBs) transmitted by a base station (BS). Each of the SSBs comprises orthogonal frequency division multiplex (OFDM) symbols. Each of the SSBs includes an index assigned by the BS. The method includes the UE switching the receive beams in time such that, for each of the SSBs, two or more of the receive beams are used to receive corresponding two or more mutually exclusive sets each having at least one but less than all of the OFDM symbols of the SSB. The method also includes, for each receive beam/SSB index pair, measuring a signal quality based on the at least one but less than all of the OFDM symbols of the indexed SSB received by the receive beam of the pair. The method also includes the UE using the measured signal qualities to select one of the receive beams to use to receive subsequent communications from the BS.

In another aspect the present invention provides a user equipment device (UE) configured to reduce receive beam selection time. The UE includes an antenna array that forms receive beams to receive synchronization signal blocks (SSBs) transmitted by a base station (BS). Each of the SSBs comprises orthogonal frequency division multiplex (OFDM) symbols. Each of the SSBs includes an index assigned by the BS. The receive beams are switched in time such that, for each of the SSBs, two or more of the receive beams are used to receive corresponding two or more mutually exclusive sets each having at least one but less than all of the OFDM symbols of the SSB. The UE also includes a processor programmed to, for each receive beam/SSB index pair, measure a signal quality based on the at least one but less than all of the OFDM symbols of the indexed SSB received by the receive beam of the pair. The processor is programmed to use the measured signal qualities to select one of the receive beams to use to receive subsequent communications from the BS.

An advantage of the embodiments described is that, relative conventional methods, they significantly reduce the time required for the UE to determine the receive beam upon which to receive transmissions from the BS.

BRIEF DESCRIPTION OF THE DRAWINGS

FIGS. 4, 6, 7 and 8 are block diagrams illustrating different embodiments of a receive beam sweeping method that uses multiple receive beams to receive different orthogonal frequency division multiplex (OFDM) symbols of each synchronization signal block to reduce receive beam selection time at the receiving user equipment device.

FIG. 5 is a table illustrating obtained signal quality measurements used to select a best receive beam/synchronization signal block pair.

DETAILED DESCRIPTION OF THE EMBODIMENTS

Figure 1:
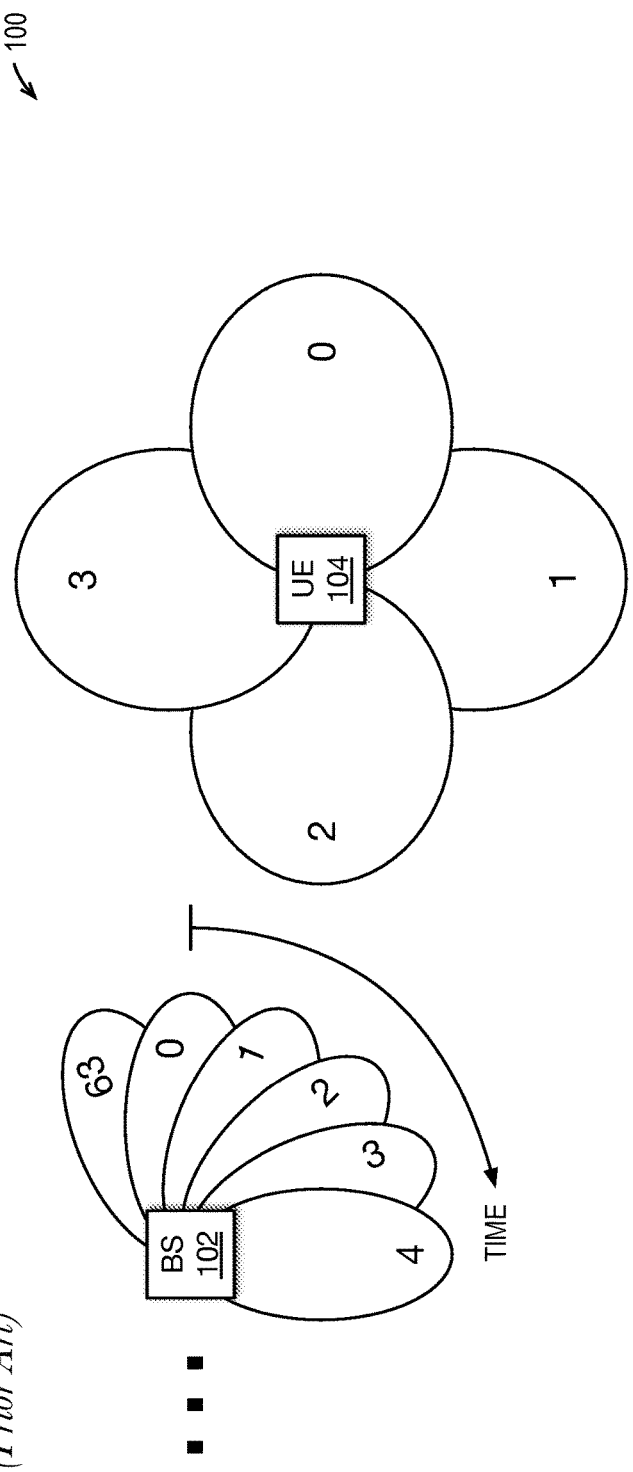
FIG. 1 is a block diagram illustrating a cellular system having a base station and a user equipment device each capable of forming multiple beams.

FIG. 1 illustrates a cellular system 100 having a base station (BS) 102 and a user equipment device (UE) 104 each capable of forming multiple beams. For ease of illustration, the UE has four receive (RX) beams indexed 0 through 3 (although the UE may have many more RX beams), and the BS has 64 transmit (TX) beams indexed 0 through 63, as shown.

Within the protocol for New Radio (NR), there are synchronization signal blocks (SSBs) that are transmitted by the BS on the TX beams for the UE to use in beam selection. Each SSB (described in more detail with respect to FIG. 2) has an associated index. For example, in FIG. 1, SSBs with indexes 0 through 63 may be transmitted on TX beams with corresponding indexes 0 through 63. The UE may not know the indices of the TX beams; instead, the UE may identify the TX beams by the index of the SSB that is transmitted upon the TX beam. The TX beams upon which SSBs are transmitted are typically wide beams. In NR, SSBs are transmitted in a burst referred to as an SSB burst set. As a default value in NR, SSB burst sets may be transmitted during a window of up to almost 5 milliseconds (i.e., a half frame). As a default value in NR, the periodicity with which the BS transmits SSB burst sets is every 20 milliseconds, although the default SSB burst periodicity may be changed by an upper layer message.

Figure 2:
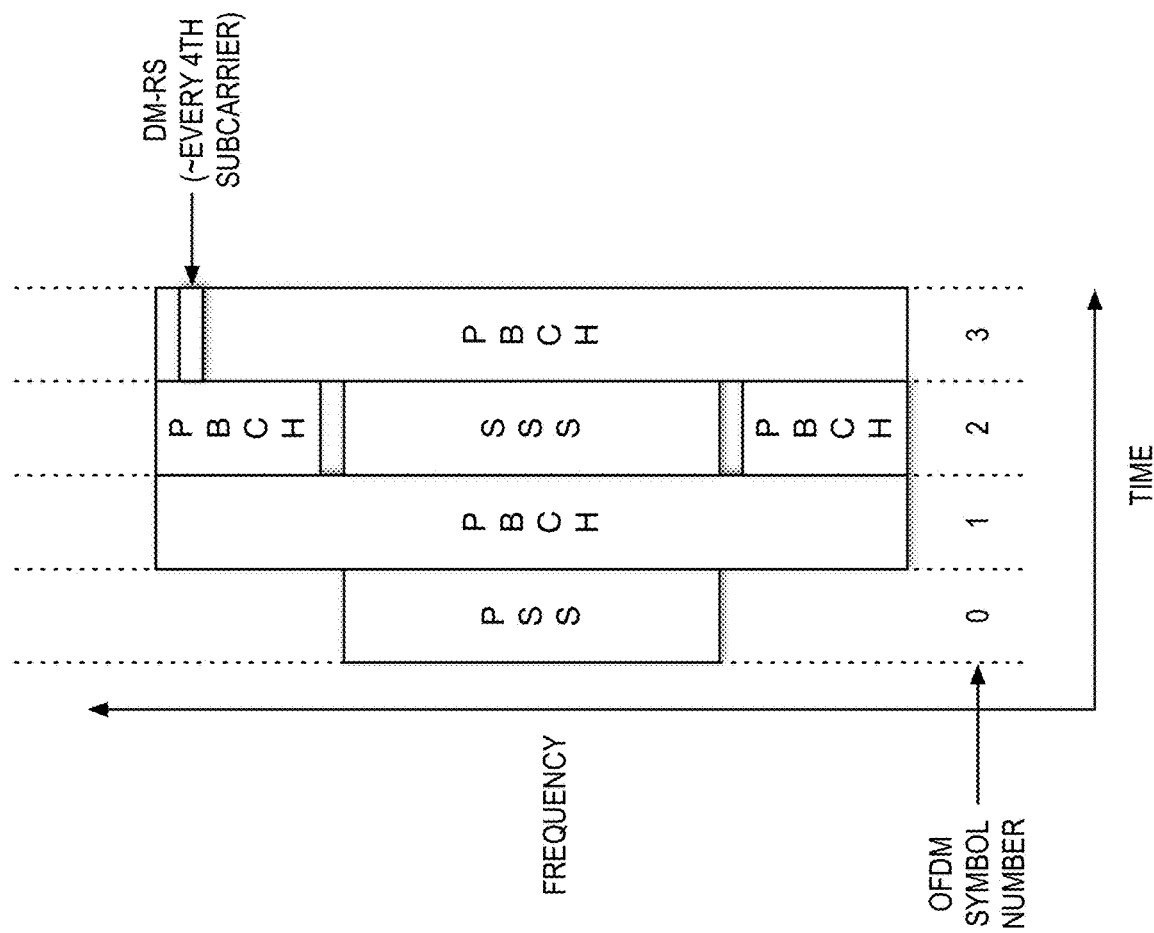
FIG. 2 is a block diagram illustrating the structure of a synchronization signal block.

FIG. 2 is a block diagram illustrating the structure of an SSB 200. An SSB 200 may also be referred to as an SS/PBCH block. The SSB 200 is structured such that it is transmitted over four orthogonal frequency division multiplex (OFDM) symbols, which are numbered 0 through 3 in FIG. 3. OFDM symbol 0 comprises a primary synchronization signal (PSS), OFDM symbol 2 comprises a secondary synchronization signal (SSS), and OFDM symbols 1 through 3 comprise a physical broadcast channel (PBCH), as shown. An SSB may also be referred to as an SS/PBCH block. The NR standard specifies that an SSB occupies 240 contiguous subcarriers in the frequency domain. More specifically, the PSS occupies 127 continuous subcarriers of OFDM symbol 0; the SSS occupies the same 127 continuous subcarriers of OFDM symbol 2; the PBCH occupies 240 contiguous subcarriers in OFDM symbols 1 and 3, occupies 48 contiguous subcarriers at the bottom of OFDM symbol 2, and occupies 48 contiguous subcarriers at the top of OFDM symbol 2; and the remaining subcarriers in the SSB are empty, i.e., are set to zero. The PBCH includes quadrature phase shift keying (QPSK) symbols that carry data. The PBCH also includes demodulation reference signals (DM-RS) that occupy approximately every fourth subcarrier, and the DM-RS subcarriers have an offset that is the cell identifier modulo 4.

Figure 3:
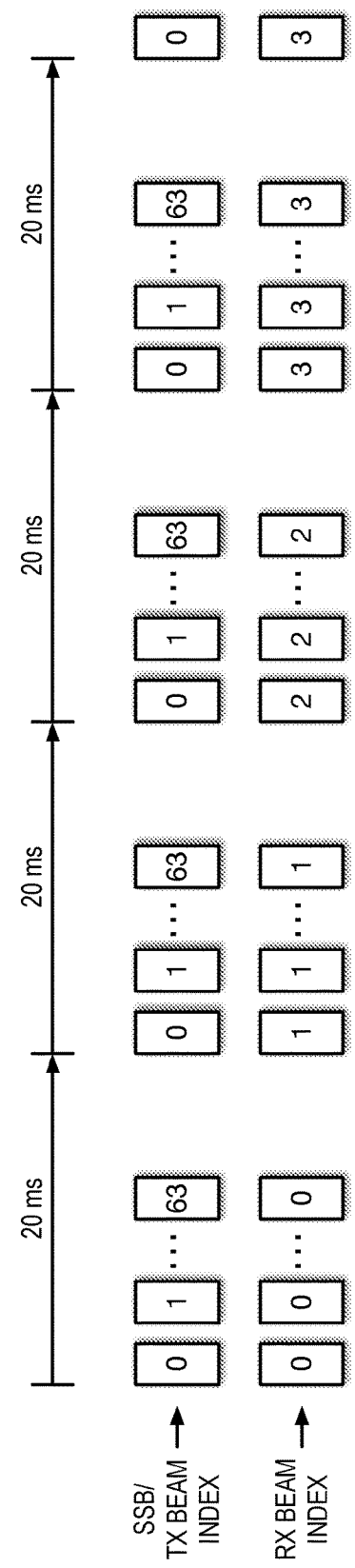
FIG. 3 is a timing diagram illustrating an example of a conventional beam selection process that may be performed by a conventional user equipment.

FIG. 3 is a timing diagram illustrating an example of a conventional beam selection process that may be performed by a conventional UE. The process is described with reference to the system 100 of FIG. 1, although embodiments are described below with respect to FIGS. 4 through 10 of a UE that performs the beam selection process in a significantly more efficient manner. For ease of illustration in the example, it is assumed that the index of an SSB transmitted on a TX beam matches the TX beam index. In the example, it is also assumed that the BS 102 makes a sweep of all of its TX beams every 20 milliseconds. During the first BS beam sweep, the UE 104 uses RX beam 0 to receive all 64 SSBs; during the second BS beam sweep, the UE 104 uses RX beam 1 to receive all 64 SSBs; during the third BS beam sweep, the UE 104 uses RX beam 2 to receive all 64 SSBs; during the fourth BS beam sweep, the UE 104 uses RX beam 3 to receive all 64 SSBs. The UE 104 measures the signal quality for each TX/RX beam pair in order to make a selection of the best TX and RX beams for the BS and UE to use. In the example, the worst-case time required to make the selection is approximately 80 milliseconds, as shown, i.e., the number of RX beams (4) multiplied by the BS beam sweep period (20 milliseconds). As may be observed, the determination time may be relatively large, particularly as the number of RX beams increases. Hence, there is a need for an efficient mechanism for beam selection at a UE receiver to identify the best receive beam.

As may be observed with respect to FIG. 3, in a conventional beam acquisition process, the UE uses the same RX beam to receive an entire SSB. The UE then measures the signal quality associated with the single RX beam by using all the OFDM symbols of received the SSB. However, embodiments are described in which the UE switches the RX beams in time within an SSB by using multiple RX beams to receive different OFDM symbols of each SSB (which may be referred to as intra-SSB switching) and measures the signal quality associated with each used RX beam by using fewer than all the OFDM symbols of the SSB. In this manner, the number of SSB burst sets that the UE must scan may be reduced, and consequently the time required for the UE to select a RX beam may be advantageously reduced. The UE also switches the RX beams in an inter-SSB manner to ensure that, for each of the BS TX beams, each of the UE's RX beams is used to receive at least one but less than all the OFDM symbols of an SSB transmitted on the TX beam in order to measure the signal quality associated with all the RX/TX beam pairs in order to indicate to the BS a preferred TX beam, i.e., a preferred SSB index.

FIG. 4 is a block diagram illustrating one embodiment of an RX beam sweeping method that uses multiple RX beams to receive different OFDM symbols of each SSB to reduce RX beam selection time at the receiving UE. In the example of FIG. 4, it is assumed the UE is determining which of 4 different RX beams that it beamforms, denoted RX0 through RX3, is the best RX beam to receive transmissions from the BS. As described above, 4 RX beams are used in the example to simplify the description; however, the UE may have more than 4 RX beams. In the example of FIG. 4, it is also assumed the BS transmits a burst set of 64 SSBs indexed 0 through 63 on 64 corresponding TX beams at a periodicity of 20 milliseconds, as shown.

As shown, the UE switches the RX beams in time such that RX0 is used to receive OFDM symbol 0 of each SSB, RX1 is used to receive OFDM symbol 1 of each SSB, RX2 is used to receive OFDM symbol 2 of each SSB, and RX3 is used to receive OFDM symbol 3 of each of the SSBs. That is, the UE uses 4 different RX beams per SSB to receive 4 different OFDM symbols of the SSB. As shown in FIG. 5, for each RX beam/SSB index pair, which corresponds to an RX beam/TX beam pair, the UE measures and stores the signal quality associated with the RX beam/SSB index pair based on the single OFDM symbol of the indexed SSB received by the RX beam of the pair. The UE then uses the measured signal qualities to select one of the RX beams to receive subsequent communications from the BS, e.g., the pair having the best signal quality, as shown in FIG. 5. The UE then reports to the BS the preferred SSB index (e.g., SSB index 61 in the example of FIG. 5), and the UE uses the best RX beam (e.g., RX2 in the example of FIG. 5) to receive subsequent transmissions from the BS.

As a result, the worst-case time for the UE to receive one OFDM symbol by each of the 4 RX beams from each of the 64 TX beams for signal quality measurement is 20 milliseconds, as shown. That is, only one SSB burst set time is required, as opposed to four in the conventional approach described with respect to FIG. 3, so that a significant decrease (e.g., approximately 4× decrease) over the conventional method may be appreciated. More precisely, the beam selection time is one SSB burst set time, e.g., up to 5 milliseconds for some NR sub-carrier spacings and frequency ranges (in addition to any non-overlapping latency associated with computing the signal quality measurements and analyzing the signal qualities to select the best RX beam). More generally, as the number of RX beams increases and as may be inferred from the examples of FIGS. 4 and 6 through 10 described below, the worst-case time is approximately the product of the SSB burst set periodicity and the ceiling function of the quotient of the total number of RX beams divided by the number of RX beams used per SSB (and PDCCH Type 0 instance, in the case of the embodiment of FIG. 10), as may be observed from FIG. 4 along with the other embodiments described.

Figure 6:
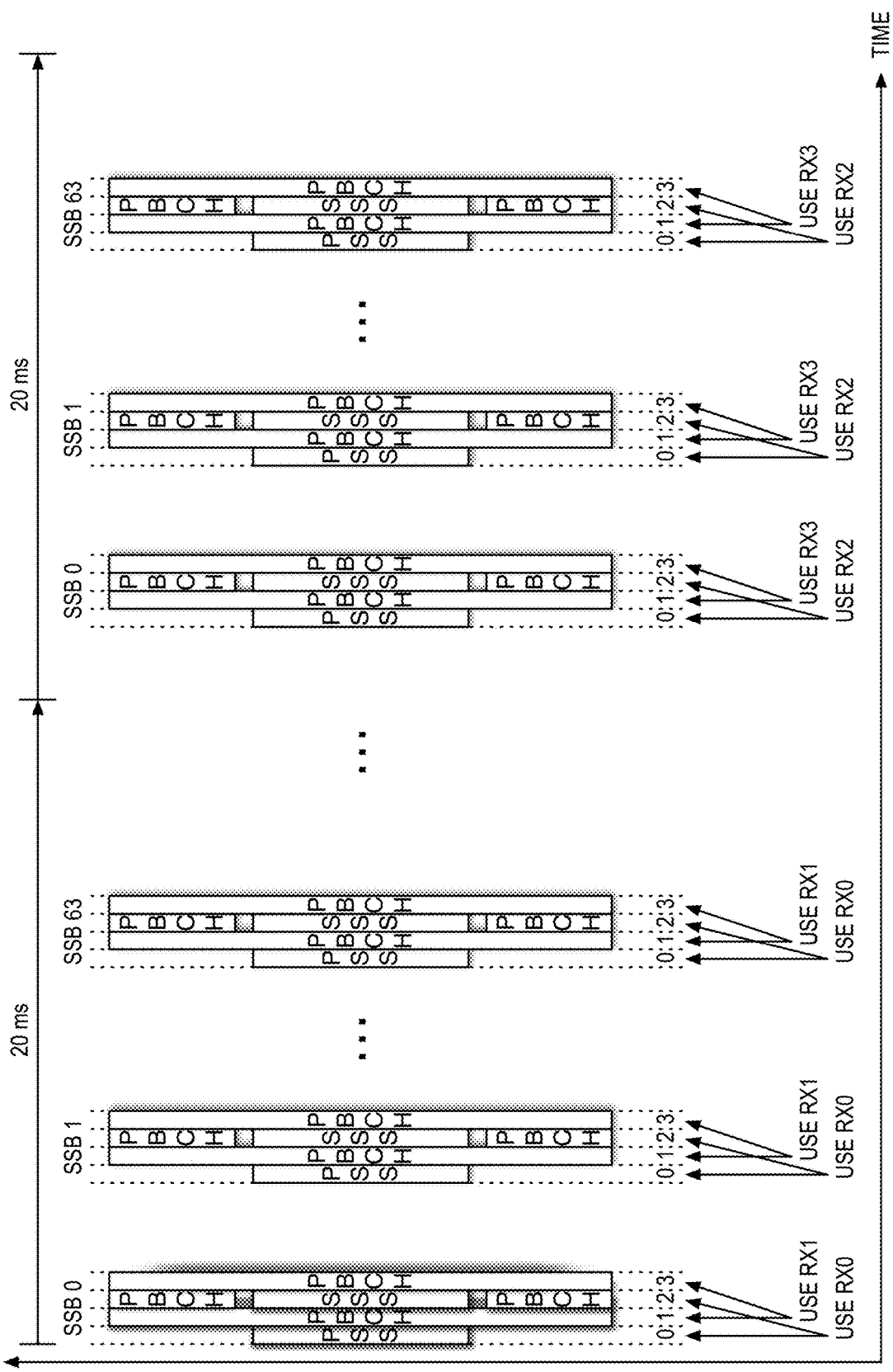

FIG. 6 is a block diagram illustrating another embodiment of an RX beam sweeping method that uses multiple RX beams to receive different OFDM symbols of each SSB to reduce RX beam selection time at the receiving UE. The embodiment of FIG. 6 is similar in many respects to the embodiment of FIG. 4. However, in the embodiment of FIG. 6, the UE switches the RX beams in time such that RX0 is used to receive OFDM symbols 0 and 2 of each SSB of the first SSB burst set, RX1 is used to receive OFDM symbols 1 and 3 of each SSB of the first SSB burst set, RX2 is used to receive OFDM symbols 0 and 2 of each SSB of the second SSB burst set, and RX3 is used to receive OFDM symbols 1 and 3 of each of the SSBs of the second SSB burst set. That is, the UE uses 2 different RX beams per SSB to receive 2 mutually exclusive sets each having 2 different OFDM symbols of the SSB. As a result, the worst-case time for the UE to receive two OFDM symbols by each of the 4 RX beams from each of the 64 TX beams for signal quality measurement is 20 milliseconds*(4/2)=40 milliseconds, as shown. That is, only two SSB burst set times are required, as opposed to four in the conventional approach described with respect to FIG. 3, so that a significant decrease (e.g., approximately 2× decrease) over the conventional method may be appreciated. More precisely, the beam selection time is one SSB period plus one SSB burst set time, e.g., 20 milliseconds plus up to 5 milliseconds (in addition to any non-overlapping latency associated with computing the signal quality measurements and analyzing the signal qualities to select the best RX beam).

Figure 7:
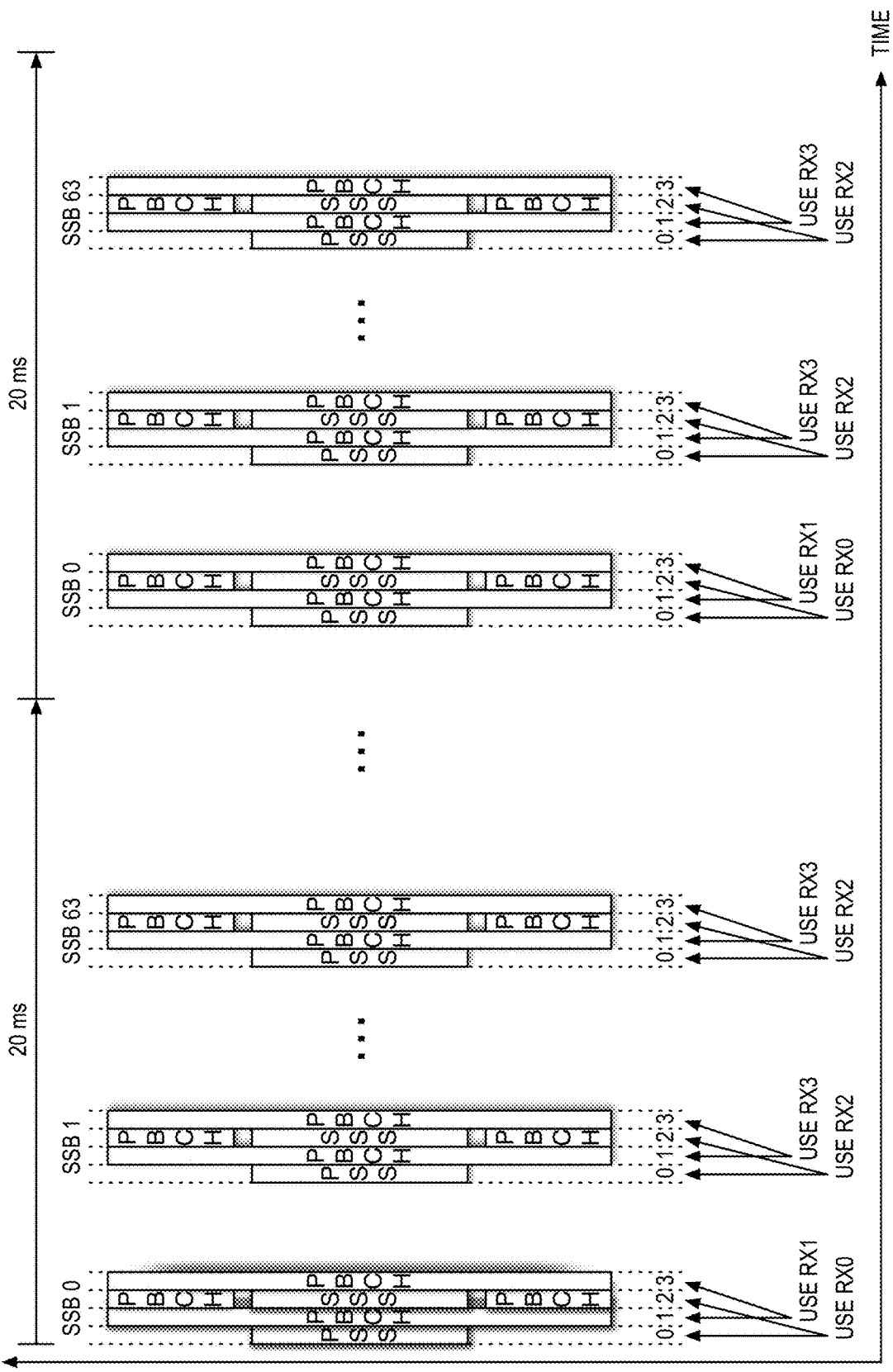

FIG. 7 is a block diagram illustrating another embodiment of an RX beam sweeping method that uses multiple RX beams to receive different OFDM symbols of each SSB to reduce RX beam selection time at the receiving UE. The embodiment of FIG. 7 is similar in many respects to the embodiment of FIG. 6. However, in the embodiment of FIG. 7, the UE switches the RX beams in time such that RX0 is used to receive OFDM symbols 0 and 2 of every other SSB (e.g., every even-indexed SSB) of both the first and second SSB burst sets, RX1 is used to receive OFDM symbols 1 and 3 of every other SSB (e.g., every even-indexed SSB) of both the first and second SSB burst sets, RX2 is used to receive OFDM symbols 0 and 2 of every other SSB (e.g., every odd-indexed SSB) of both the first and second SSB burst sets, and RX3 is used to receive OFDM symbols 1 and 3 of every other SSB (e.g., every odd-indexed SSB) of both the first and second SSB burst sets. That is, the UE uses 2 different RX beams per SSB to receive 2 mutually exclusive sets each having 2 different OFDM symbols of the SSB. As a result, the worst-case time for the UE to receive two OFDM symbols by each of the 4 RX beams from each of the 64 TX beams for signal quality measurement is 20 milliseconds*(4/2)=40 milliseconds, as shown. That is, only two SSB burst set times are required, as opposed to four in the conventional approach described with respect to FIG. 3, so that a significant decrease (e.g., approximately 2× decrease) over the conventional method may be appreciated. More precisely, the beam selection time is one SSB period plus one SSB burst set time, e.g., 20 milliseconds plus up to 5 milliseconds (in addition to any non-overlapping latency associated with computing the signal quality measurements and analyzing the signal qualities to select the best RX beam).

Figure 8:
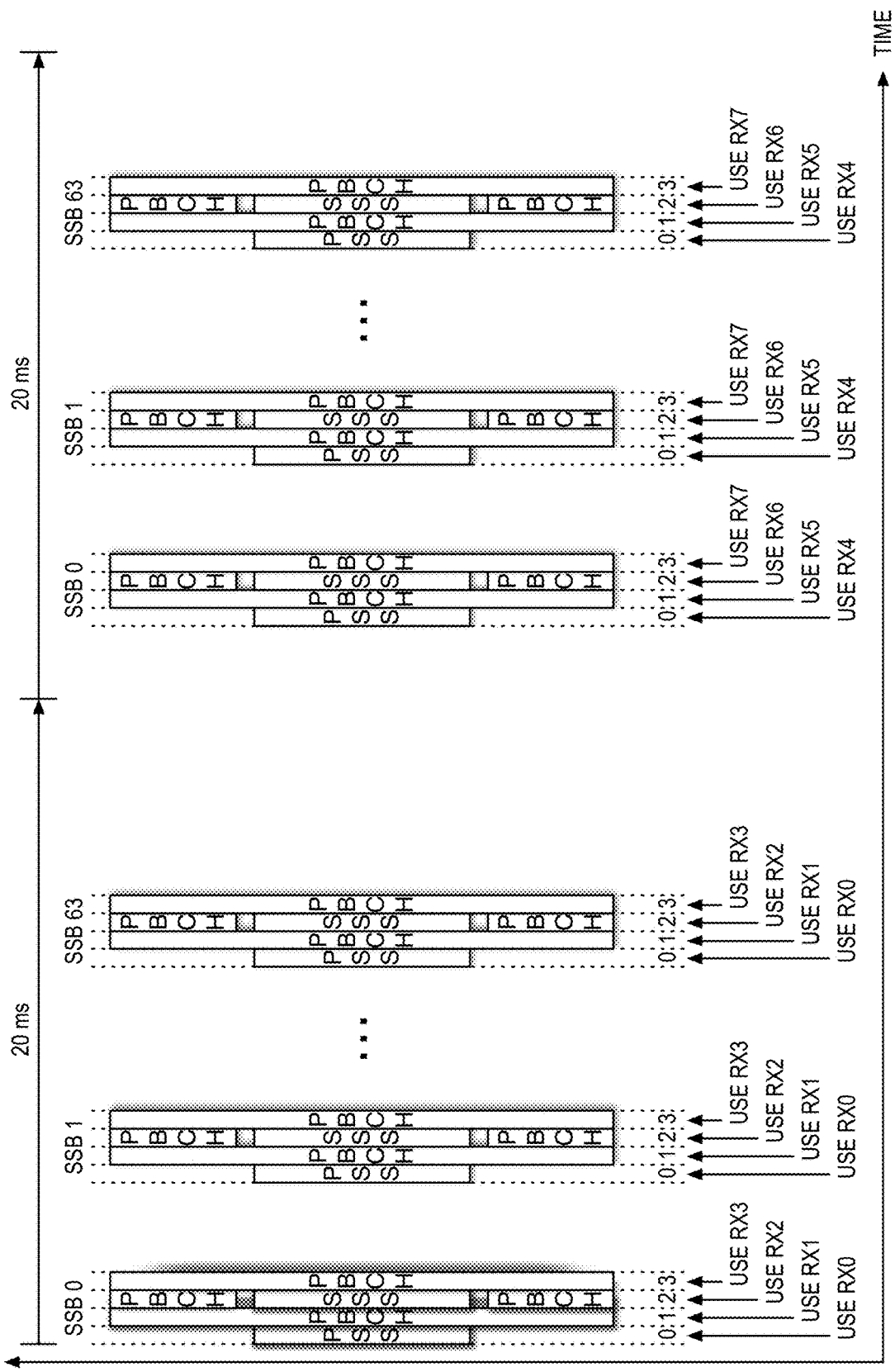

FIG. 8 is a block diagram illustrating another embodiment of an RX beam sweeping method that uses multiple RX beams to receive different OFDM symbols of each SSB to reduce RX beam selection time at the receiving UE. The embodiment of FIG. 8 is similar in many respects to the embodiment of FIG. 4. However, in the embodiment of FIG. 8, it is assumed the UE is determining which of 8 different RX beams that it beamforms, denoted RX0 through RX7, is the best RX beam to receive transmissions from the BS. The UE switches the RX beams in time such that RX0 is used to receive OFDM symbol 0 of each SSB of the first SSB burst set, RX1 is used to receive OFDM symbol 1 of each SSB of the first SSB burst set, RX2 is used to receive OFDM symbol 2 of each SSB of the first SSB burst set, RX3 is used to receive OFDM symbol 3 of each SSB of the first SSB burst set, RX4 is used to receive OFDM symbol 0 of each SSB of the second SSB burst set, RX5 is used to receive OFDM symbol 1 of each SSB of the second SSB burst set, RX6 is used to receive OFDM symbol 2 of each SSB of the second SSB burst set, and RX7 is used to receive OFDM symbol 3 of each SSB of the second SSB burst set. That is, the UE uses 4 different RX beams per SSB to receive 4 different OFDM symbols of the SSB. As a result, the worst-case time for the UE to receive one OFDM symbol by each of the 8 RX beams from each of the 64 TX beams for signal quality measurement is 20 milliseconds*(8/4)=40 milliseconds, as shown. That is, only two SSB burst set times are required, as opposed to eight in the conventional approach described with respect to FIG. 3, so that a significant decrease (e.g., approximately 4× decrease) over the conventional method may be appreciated. More precisely, the beam selection time is one SSB period plus one SSB burst set time, e.g., 20 milliseconds plus up to 5 milliseconds (in addition to any non-overlapping latency associated with computing the signal quality measurements and analyzing the signal qualities to select the best RX beam).

Figure 9:
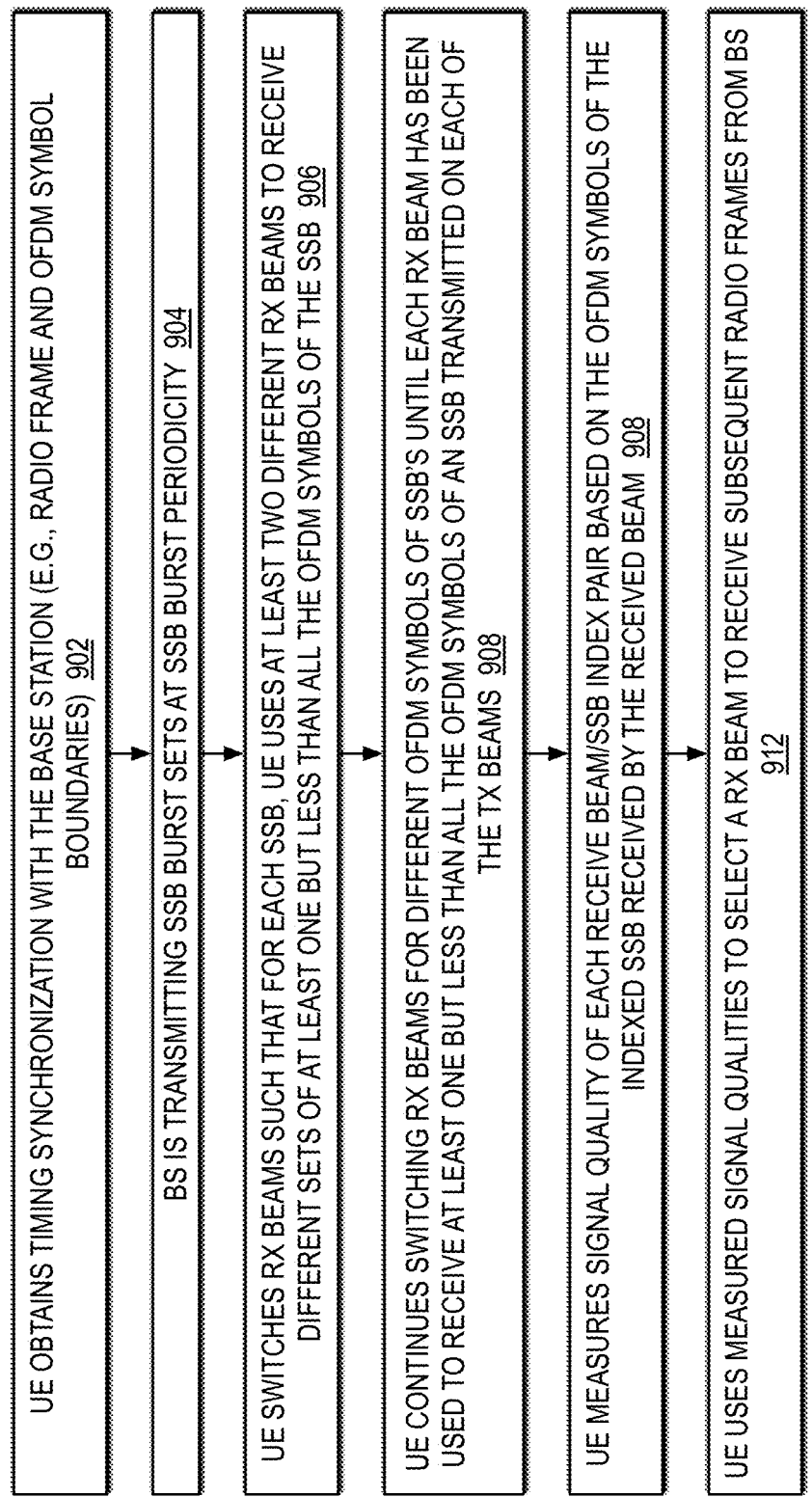
FIG. 9 is a flowchart illustrating embodiments of an receive beam sweeping method that uses multiple receive beams to receive different OFDM symbols of each synchronization signal block to reduce receive beam selection time at the receiving user equipment device.

FIG. 9 is a flowchart describing embodiments of an RX beam sweeping method that uses multiple RX beams to receive different OFDM symbols of each SSB to reduce RX beam selection time at the receiving UE. Operation begins at block 902.

At block 902, the UE performs timing synchronization with the BS. That is, the UE obtains the knowledge of the OFDM symbol, slot and radio frame boundaries of the BS transmissions. In one embodiment, the UE also receives and decodes the master information block (MIB) of the BS cell received from the PBCH. Operation proceeds to block 904.

At block 904, the BS is transmitting SSB burst sets at its SSB burst periodicity, e.g., SSB half frame burst set periodicity. Operation proceeds to block 906.

At block 906, the UE switches its receive beams in a time-multiplexed fashion such that for each SSB transmitted by the BS, the UE uses at least two different ones of its receive beams to receive different sets of at least one but less than all of the OFDM symbols of the SSB. For example, in the embodiment of FIG. 4, the UE uses four different receive beams (RX0, RX1, RX2 and RX3) to each receive a different set of one OFDM symbol of the four OFDM symbols of each SSB. For another example, in the embodiment of FIG. 6, the UE uses two different receive beams (RX0 and RX1 for the SSBs in the first SSB burst set, and RX2 and RX3 for the SSBs in the second SSB burst set) to receive two different sets of two OFDM symbols (the first set including symbols 0 and 2, the second set including symbols 1 and 3) of the four OFDM symbols of each SSB. For yet another example, in the embodiment of FIG. 7, the UE uses two different receive beams (RX0 and RX1 for the even-indexed SSBs, and RX2 and RX3 for the odd-indexed SSBs) to receive two different sets of two OFDM symbols (the first set including symbols 0 and 2, the second set including symbols 1 and 3) of the four OFDM symbols of each SSB. For yet another example, in the embodiment of FIG. 8, the UE uses four different receive beams (RX0, RX1, RX2 and RX3) to each receive a different set of one OFDM symbol of the four OFDM symbols of each SSB in the first SSB burst set, and the UE uses four different receive beams (RX4, RX5, RX6 and RX7) to each receive a different set of one OFDM symbol of the four OFDM symbols of each SSB in the second SSB burst set.

For yet another example, in the embodiment of FIG. 10 described in more detail below, the UE uses five different receive beams (RX0, RX1, RX2, RX3 and RX4) to each receive a different set of one OFDM symbol of the five OFDM symbols of the combination of four OFDM symbols of each SSB in a first SSB burst set plus a single OFDM symbol of physical downlink control channel (PDCCH) Type 0 instances (described in more detail below) corresponding to the first SSB burst set, the UE uses five different receive beams (RX5, RX6, RX7, RX8 and RX9) to each receive a different set of one OFDM symbol of the five OFDM symbols of the combination of four OFDM symbols of each SSB in a second SSB burst set plus a single OFDM symbol of PDCCH Type 0 instances corresponding to the second SSB burst set, the UE uses five different receive beams (RX10, RX11, RX12, RX13 and RX14) to each receive a different set of one OFDM symbol of the five OFDM symbols of the combination of four OFDM symbols of each SSB in a third SSB burst set plus a single OFDM symbol of PDCCH Type 0 instances corresponding to the third SSB burst set, the UE uses five different receive beams (RX15, RX16, RX17, RX18 and RX19) to each receive a different set of one OFDM symbol of the five OFDM symbols of the combination of four OFDM symbols of each SSB in a fourth SSB burst set plus a single OFDM symbol of PDCCH Type 0 instances corresponding to the fourth SSB burst set, the UE uses five different receive beams (RX20, RX21, RX22, RX23 and RX24) to each receive a different set of one OFDM symbol of the five OFDM symbols of the combination of four OFDM symbols of each SSB in a fifth SSB burst set plus a single OFDM symbol of PDCCH Type 0 instances corresponding to the fifth SSB burst set, the UE uses five different receive beams (RX25, RX26, RX27, RX28 and RX29) to each receive a different set of one OFDM symbol of the five OFDM symbols of the combination of four OFDM symbols of each SSB in a sixth SSB burst set plus a single OFDM symbol of PDCCH Type 0 instances corresponding to the sixth SSB burst set, and the UE uses two different receive beams (RX30 and RX31) to each receive a different set of one OFDM symbol of the five OFDM symbols of the combination of four OFDM symbols of each SSB in a seventh SSB burst set plus a single OFDM symbol of PDCCH Type 0 instances corresponding to the seventh SSB burst set.

It should be understood that although various examples are described with respect to FIGS. 4 and 6 through 10 of different combinations of number of UE receive beams, number of receive beams used per SSB to receive OFDM symbols, and the number of OFDM symbols received by each receive beam, the embodiments are intended to cover any combination in order to appreciate a speedup on the beam selection time over a conventional approach. For example, one receive beam could be used to receive one OFDM symbol of the four SSB OFDM symbols for signal quality measurement, and another receive beam could be used to receive the other three OFDM symbols for signal quality measurement. For another example, one receive beam could be used to receive one OFDM symbol of the four SSB OFDM symbols for signal quality measurement, another receive beam could be used to receive another one OFDM symbol of the four SSB OFDM symbols for signal quality measurement, and yet another receive beam could be used to receive the other two OFDM symbols for signal quality measurement.

Furthermore, although embodiments are described in which the number of transmit beams is 64 corresponding to 64 SSB indexes, other embodiments are contemplated to accommodate other numbers of transmit beams and corresponding SSB indexes (and corresponding PDCCH Type 0 instances). For example, if the cell includes 64 SSBs in an SSB burst set per half frame at a 20 millisecond periodicity and the number of transmit beams used by the BS in the SSB beam sweep is 128, then the SSBs are indexed 0 through 127 and occupy two different SSB burst sets such that the periodicity of a full BS beam sweep is 40 milliseconds. For another example, if the cell includes 64 SSBs in an SSB burst set per half frame at a 20 millisecond periodicity and the number of transmit beams used by the BS in the SSB beam sweep is 32, then the SSBs are indexed 0 through 31 and occupy only half the SSBs in an SSB burst set. In one embodiment, the UE initiates the beam selection process (e.g., switching of the receive beams at block 906 and subsequent operations) without waiting to decode the system information block 1 (SIB1) information, which has SSB periodicity and SSB index location information. However, after the SIB1 information is acquired, the UE updates the loop running duration and updates the locations to monitor for the SSBs. More specifically, the loop running duration is set to the SSB half frame burst set periodicity. Operation proceeds to block 908.

At block 908, the UE measures the signal quality associated with each receive beam/SSB index pair using the OFDM symbols of the indexed SSB of the pair (and indexed PDCCH Type 0 instance, if used) received by the receive beam of the pair. In one embodiment, the signal quality measurements may be performed in parallel with the OFDM symbol receiving at block 906. As described above, the SSB includes within its OFDM symbols a PSS, a SSS, a PBCH that includes QPSK symbols and DM-RS, and empty resource elements. To measure the signal quality, the UE may perform one or more of the following: measure the signal quality by using the PSS, measure the signal quality by using the SSS, estimate the signal quality by using one or more of the DM-RS, estimate the signal quality by equalizing and using the QPSK symbols, and measure noise plus interference power on one or more of the empty resource elements. Additionally, to measure the signal quality, the UE may measure one or more of: the reference signal received power (RSRP), signal-to-interference-plus-noise ratio (SINR), received signal strength indicator (RSSI), and reference signal received quality (RSRQ). Finally, to measure the signal quality, the UE may compensate for OFDM symbols transmitted by the BS with different power. For example, the UE may detect whether there is a power boost (e.g., 3 dB) on the PSS over the SSS and compensate per the detection criteria of the receive beam. Operation proceeds to block 912.

At block 912, the UE uses the signal qualities measured at block 908 to select a receive beam upon which to receive subsequent transmissions from the BS. That is, the UE selects a receive beam/SSB index pair, e.g., with the highest signal quality among all the receive beam/SSB index pairs. Additionally, the UE indicates to the BS (e.g., via a physical random access channel (PRACH) transmission) the SSB index of the selected pair to inform the BS that the UE prefers the BS to subsequently transmit to the UE on the transmit beam associated with the indicated SSB index.

NR also specifies a physical downlink control channel (PDCCH) Type 0. Each PDCCH Type 0 instance is included within a single OFDM symbol early in a NR radio frame. The PDCCH Type 0 channel is used to transmit control information. Like the SSBs, the PDCCH is "always on," i.e., the BS is always transmitting the PDCCH Type 0 instances and does so on a periodic basis that matches the SSB burst set periodicity. Furthermore, each PDCCH Type 0 channel instance includes an index that corresponds to an SSB index and consequently to the same BS TX beam associated with the SSB index. Each PDCCH Type 0 instance includes DM-RS for PDCCH, which may be used by the UE to measure signal quality.

Figure 10A:
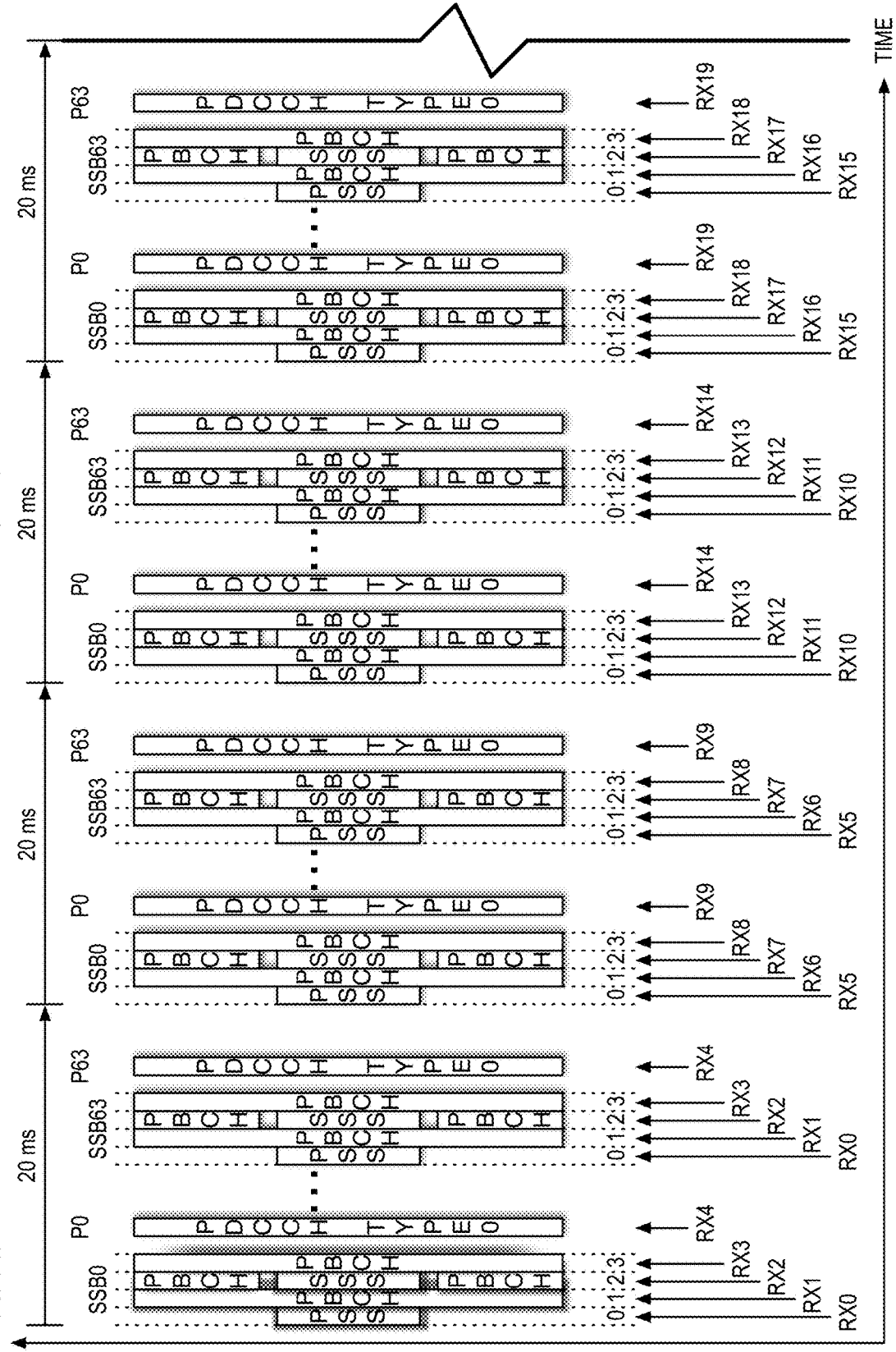
FIGS. 10A and 10B, referred to collectively as FIG. 10, are block diagrams illustrating an embodiment of a receive beam sweeping method that uses multiple receive beams to receive different OFDM symbols of each synchronization signal block and corresponding physical downlink control channel Type 0 instance to reduce receive beam selection time at the receiving UE.
Figure 10B:
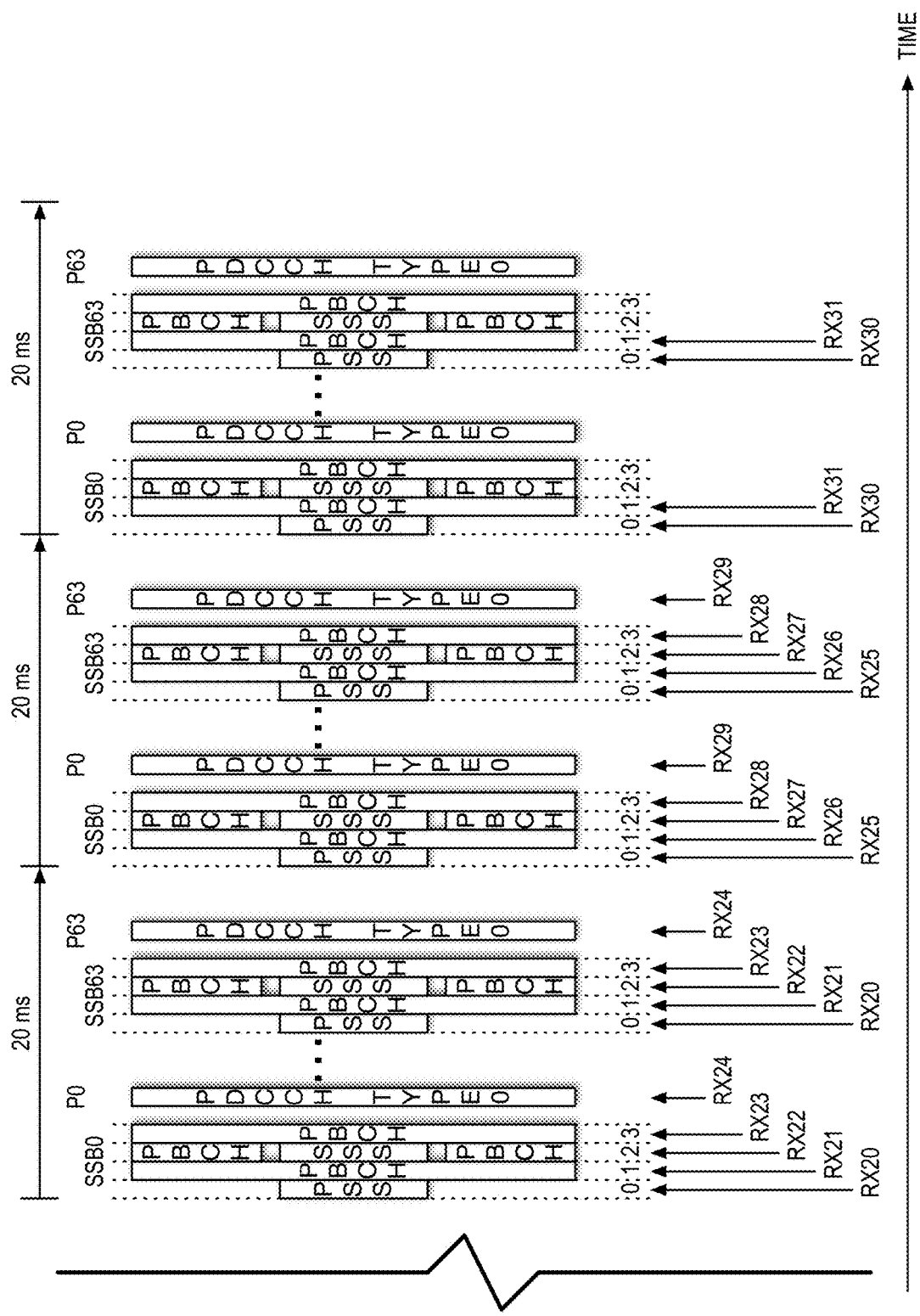

FIGS. 10A and 10B, referred to collectively as FIG. 10, illustrate an alternate embodiment of an RX beam sweeping method that uses multiple RX beams to receive different OFDM symbols of each SSB and a PDCCH Type 0 instance to reduce RX beam selection time at the receiving UE. In the embodiment of FIG. 10, the UE uses the OFDM symbol of the of PDCCH Type 0 instances as a fifth OFDM symbol in conjunction with the four SSB OFDM symbols as an opportunity to switch another RX beam to receive an OFDM symbol to further reduce the UE RX beam selection time. That is, the UE switches its RX beams among the five SSB and PDCCH Type 0 OFDM symbols such that for each combination of SSB/PDCCH Type 0 index, the UE uses at least two different RX beams to receive different sets of at least one but less than all of the OFDM symbol of the combination.

The embodiment of FIG. 10 is similar in many respects to the embodiment of FIG. 8. However, in the embodiment of FIG. 10, it is assumed the UE is determining which of 32 different RX beams that it beamforms, denoted RX0 through RX31, is the best RX beam to receive transmissions from the BS. The UE switches the RX beams in time such that RX0 is used to receive OFDM symbol 0 of each SSB of the first SSB burst set, RX1 is used to receive OFDM symbol 1 of each SSB of the first SSB burst set, RX2 is used to receive OFDM symbol 2 of each SSB of the first SSB burst set, RX3 is used to receive OFDM symbol 3 of each SSB of the first SSB burst set, RX4 is used to receive the OFDM symbol of each the 64 PDCCH Type 0 instances associated with the first SSB burst set; RX5 is used to receive OFDM symbol 0 of each SSB of the second SSB burst set, RX6 is used to receive OFDM symbol 1 of each SSB of the second SSB burst set, RX7 is used to receive OFDM symbol 2 of each SSB of the second SSB burst set, RX8 is used to receive OFDM symbol 3 of each SSB of the second SSB burst set, RX9 is used to receive the OFDM symbol of each the 64 PDCCH Type 0 instances associated with the second SSB burst set; RX10 is used to receive OFDM symbol 0 of each SSB of the third SSB burst set, RX11 is used to receive OFDM symbol 1 of each SSB of the third SSB burst set, RX12 is used to receive OFDM symbol 2 of each SSB of the third SSB burst set, RX13 is used to receive OFDM symbol 3 of each SSB of the third SSB burst set, RX14 is used to receive the OFDM symbol of each the 64 PDCCH Type 0 instances associated with the third SSB burst set; RX15 is used to receive OFDM symbol 0 of each SSB of the fourth SSB burst set, RX16 is used to receive OFDM symbol 1 of each SSB of the fourth SSB burst set, RX17 is used to receive OFDM symbol 2 of each SSB of the fourth SSB burst set, RX18 is used to receive OFDM symbol 3 of each SSB of the fourth SSB burst set, RX19 is used to receive the OFDM symbol of each the 64 PDCCH Type 0 instances associated with the fourth SSB burst set; RX20 is used to receive OFDM symbol 0 of each SSB of the fifth SSB burst set, RX21 is used to receive OFDM symbol 1 of each SSB of the fifth SSB burst set, RX22 is used to receive OFDM symbol 2 of each SSB of the fifth SSB burst set, RX23 is used to receive OFDM symbol 3 of each SSB of the fifth SSB burst set, RX24 is used to receive the OFDM symbol of each the 64 PDCCH Type 0 instances associated with the fifth SSB burst set; RX25 is used to receive OFDM symbol 0 of each SSB of the sixth SSB burst set, RX26 is used to receive OFDM symbol 1 of each SSB of the sixth SSB burst set, RX27 is used to receive OFDM symbol 2 of each SSB of the sixth SSB burst set, RX28 is used to receive OFDM symbol 3 of each SSB of the sixth SSB burst set, RX29 is used to receive the OFDM symbol of each the 64 PDCCH Type 0 instances associated with the sixth SSB burst set; RX30 is used to receive OFDM symbol 0 of each SSB of the seventh SSB burst set, and RX31 is used to receive OFDM symbol 1 of each SSB of the seventh SSB burst set. That is, the UE uses 32 different RX beams per SSB to receive 4 different OFDM symbols, i.e., 4 of the SSB plus the one of the PDCCH Type 0 instance. As a result, the worst-case time for the UE to receive one OFDM symbol by each of the 32 RX beams from each of the 64 TX beams for signal quality measurement is 20 milliseconds*ceiling(32/5)=140 milliseconds, as shown. That is, only seven SSB burst set times are required, as opposed to 32 in the conventional approach described with respect to FIG. 3, so that a significant decrease (e.g., approximately greater than 4× decrease) over the conventional method may be appreciated. More precisely, the beam selection time is six SSB periods plus one SSB burst set time, e.g., 120 milliseconds plus up to 5 milliseconds (in addition to any non-overlapping latency associated with computing the signal quality measurements and analyzing the signal qualities to select the best RX beam).

Although FIG. 10 illustrates the PDCCH Type 0 instances as appearing to follow the SSB instances close in time, this is to simplify the illustration to aid in understanding; however, it should be understood that the PDCCH Type 0 instances may occur at different locations than the SSB instances within an NR radio frame and may even occur within different frames altogether. Thus, the worst-case beam determination time may be slightly longer than shown. Nevertheless, a significant decrease (e.g., approximately 5× decrease) over the conventional method may be appreciated.

Although embodiments have been described in which the BS makes a full spatial sweep of its cell, e.g., to enable a UE to accomplish an initial access to the BS, other embodiments are contemplated in which the BS TX beam sweep is limited to a narrower spatial range and/or in which the UE performs its RX beam sweep that switches RX beams within OFDM symbols of each SSB (and each PDCCH Type 0 instance combination, in some embodiments) upon a narrower spatial range of the full BS TX beam sweep. Furthermore, although embodiments are described in which the UE RX beam sweep includes a full spatial sweep, other embodiments are contemplated in which the UE RX beam sweep is limited to a narrower spatial range. Still further, although embodiments have been described with respect to a single antenna array at the UE, other embodiments are contemplated in which the UE includes multiple antenna arrays, in which case the UE may perform the techniques described herein to perform reduced-time beam selection in parallel with respect to the different antenna arrays.

Figure 11:
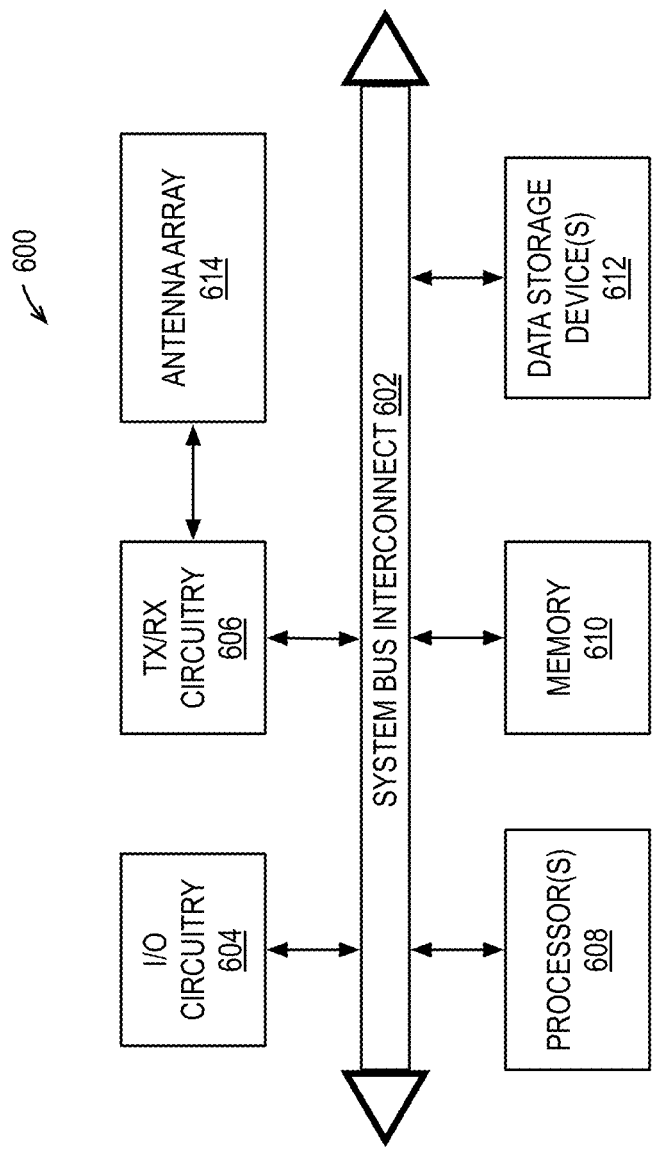
FIG. 11 is a block diagram of an example embodiment for electronic components that can be used to implement a user equipment device including the functions and operational features described for performing a receive beam sweeping method that uses multiple receive beams to receive different OFDM symbols of each synchronization signal block to reduce receive beam selection time at the receiving user equipment device.

FIG. 11 is a diagram of an example embodiment 600 for electronic components that can be used to implement a user equipment (UE) including the functions and operational features described for the disclosed embodiments. For the example embodiment 600 shown in FIG. 11, one or more processors 608 communicate with other components through system bus interconnect 602. For example, the one or more processors 608 communicate with input/output (I/O) circuitry 604 and transmit/receive (TX/RX) circuitry 606 through the system bus interconnect 602. Additional circuitry can also be included such as power supply circuitry and/or other desired circuitry. The TX/RX circuitry 606 provides one or more cellular radios that are coupled to one or more antenna arrays 614 through which the TX/RX circuitry transmits and receives RF (radio frequency) signals (e.g., in the NR FR1 and FR2 ranges). The antenna arrays 614 comprise multiple physical antenna elements to accomplish beamforming of transmit and receive beams. The antenna arrays 614 may be controlled by the processors 608 and/or the TX/RX circuitry 606. The system 600 may perform transmit and receive beamforming in the digital domain, in the analog domain, or in a combination of the two using the antenna arrays 614 according to embodiments described herein to accomplish improved beam sweeping/selection time at the UE. More specifically, complex weights may be applied to a digital baseband signal prior to conversion to the analog domain for provision to RF transmit circuitry to accomplish digital transmit beamforming, and vice versa to accomplish digital receive beamforming. Furthermore, analog phase shifters may be employed after the RF transmit circuitry just before the antennas to accomplish analog transmit beamforming, and vice versa to accomplish analog receive beamforming. Still further, both digital and analog beamforming may be combined in a hybrid fashion. As an example, phased array antennas may be employed in NR FR2. For another example, UE devices may employ digital beamforming. Finally, although embodiments are described that vary beams in the azimuth, various embodiments of antenna arrays 614 are contemplated to form transmit and receive beams that are also variable in elevation. The I/O circuitry 604 provides one or more interfaces for users, such as graphical user interfaces, and/or connections to peripheral devices (e.g., displays, keyboards, mice, point device, and/or other I/O peripheral devices). The memory 610 is also coupled to the system bus interconnect 602 and can be used by the one or more processors 608 to load and/or store instructions, data, and/or other information during operation, such as operations described with respect to FIG. 9 and the other Figures to accomplish improved beam sweeping/selection time at the UE. One or more data storage device(s) 612 are also connected to the system bus interconnect 602 and can store software or program instructions and/or other desired data or information for the operation of the processing system. For example, computer-readable instructions stored in the data storage devices 612 can be loaded within the memory 610 and then executed by the processor(s) 608 to carry out the described functions to accomplish improved beam sweeping/selection time at the UE.

It is noted that different and/or additional components from those depicted in FIG. 11 could also be used to implement one or more radio systems for the described embodiments while still taking advantage of the described techniques. It is further noted that the system bus interconnect 602 can be implemented as multiple interconnection buses with or without additional intervening circuitry such as routing or switching circuitry. Further, the processor(s) 608 can be implemented using one or more programmable integrated circuits including controllers, microcontrollers, microprocessors, hardware accelerators, configurable logic devices (e.g., field programmable gate arrays), and/or other programmable integrated circuits that are programmed to carry out the described functions. Further, the one or more processor(s) 608 can execute instructions stored in a non-transitory tangible computer-readable medium to perform the described functions. In addition, data storage device(s) 612 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 610 can be any data storage medium configured to maintain data storage when powered. Other variations could may be implemented.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the new frame structures described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for teaching those skilled in the art the manner of carrying out the invention. It is to be understood that the forms of the invention herein shown and described are to be taken as present embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A method performed by a user equipment device (UE), wherein the UE is configured to beamform receive beams to receive synchronization signal blocks (SSBs) transmitted by a base station (BS), wherein each of the SSBs comprises orthogonal frequency division multiplex (OFDM) symbols, wherein each of the SSBs includes an index assigned by the BS, the method comprising:
   switching, by the UE, the receive beams in time such that, for each SSB of the SSBs, two or more of the receive beams are used to receive corresponding two or more mutually exclusive sets, each mutually exclusive set having at least one but less than all of the OFDM symbols of the SSB;
   for each receive beam/SSB index pair, measuring a signal quality based on the at least one but less than all of the OFDM symbols of the indexed SSB received by the receive beam of the pair; and
   using, by the UE, the measured signal qualities to select one of the receive beams to use to receive subsequent communications from the BS.

2. The method of claim 1,
   wherein a worst-case time (WCT) for the UE to perform said switching, said measuring and said using the measured signal qualities to select the receive beam is less than a product of P and a ceiling function of a quotient of R and Q, WCT<P*ceiling(R/Q);
   wherein P is a periodicity at which the BS transmits the SSBs;
   wherein R is the number of receive beams switched by the UE; and
   wherein Q is the number of the two or more of the receive beams used to receive the corresponding two or more mutually exclusive sets each having at least one but less than all of the OFDM symbols of the SSB.

3. The method of claim 1,
   wherein said switching comprises switching the receive beams such that each of the OFDM symbols of the SSB is received by a different one of the receive beams.

4. The method of claim 1,
   wherein said switching comprises switching the receive beams such that one of the receive beams receives two OFDM symbols of the SSB and a different one of the receive beams receives two different OFDM symbols of the SSB.

5. The method of claim 1,
   wherein said switching comprises switching the receive beams such that one of the receive beams receives one OFDM symbol of the SSB and a different one of the receive beams receives three OFDM symbols of the SSB.

6. The method of claim 1,
   wherein a first of the OFDM symbols of the SSB comprises a primary synchronization signal (PSS), a third of the OFDM symbols comprises a secondary synchronization signal (SSS), and a second, fourth and the third of the OFDM symbols comprise physical broadcast channel (PBCH) quadrature phase shift keying (QPSK) symbols and demodulation reference signals (DM-RS), and wherein the first and third of the OFDM symbols comprises empty resource elements; and
   wherein said measuring the signal quality comprises one or more of the following:
      measuring the signal quality by using the PSS;
      measuring the signal quality by using the SSS;
      estimating the signal quality by using one or more of the DM-RS;
      estimating the signal quality by equalizing and using the QPSK symbols; and
      measuring noise plus interference power on one or more of the empty resource elements.

7. The method of claim 1, further comprising:
   prior to said switching the receive beams:
      performing timing synchronization, by the UE, to obtain boundaries of the OFDM symbols transmitted by the BS.

8. The method of claim 1,
   wherein said measuring the signal quality comprises measuring one or more of the following:
      a reference signal received power (RSRP);
      a signal-to-interference-plus-noise ratio (SINR);
      a received signal strength indicator (RSSI); and
      a reference signal received quality (RSRQ).

9. The method of claim 1,
   wherein said measuring the signal quality comprises compensating for OFDM symbols transmitted by the BS with different power from the other OFDM symbols in each SSB.

10. The method of claim 1 in which the UE is capable of beamforming the receive beams to also receive physical downlink control channel (PDCCH) Type 0 instances transmitted by the BS, wherein each of the PDCCH Type 0 instances comprises an OFDM symbol, wherein each of the PDCCH Type 0 instances includes an index that corresponds to the index of one of the SSBs, the method further comprising:
   wherein said switching comprises switching the receive beams in time such that, for each of the SSBs and corresponding PDCCH Type 0 instances, two or more of the receive beams are used to receive corresponding two or more mutually exclusive sets each having at least one but less than all of the OFDM symbols of the SSB and the corresponding PDCCH Type 0 instance; and
   wherein for each receive beam/SSB index pair, said measuring the signal quality comprises measuring the signal quality based on the at least one but less than all of the OFDM symbols of the indexed SSB and the correspondingly indexed PDCCH Type 0 instance received by the receive beam of the pair.

11. The method of claim 10, wherein each of the PDCCH Type 0 instances includes demodulation reference signals (DM-RS) for PDCCH; and wherein said measuring the signal quality comprises estimating the signal quality by using one or more of the DM-RS.

12. The method of claim 1, further comprising:

indicating to the BS, by the UE, the SSB index of the pair of the selected one receive beam to inform the BS that the UE prefers the BS to subsequently transmit to the UE on the transmit beam associated with the indicated SSB index.

13. A user equipment device (UE), comprising:

an antenna array that forms receive beams to receive synchronization signal blocks (SSBs) transmitted by a base station (BS), wherein each of the SSBs comprises orthogonal frequency division multiplex (OFDM) symbols, wherein each of the SSBs includes an index assigned by the BS;

wherein the receive beams are switched in time such that, for each SSB of the SSBs, two or more of the receive beams are used to receive corresponding two or more mutually exclusive sets, each mutually exclusive set having at least one but less than all of the OFDM symbols of the SSB;

a processor programmed to, for each receive beam/SSB index pair, measure a signal quality based on the at least one but less than all of the OFDM symbols of the indexed SSB received by the receive beam of the pair; and wherein the processor is programmed to use the measured signal qualities to select one of the receive beams to use to receive subsequent communications from the BS.

14. The UE of claim 13, wherein a worst-case time (WCT) for the UE to switch the receive beams, measure and use the measured signal qualities to select the receive beam is less than a product of P and a ceiling function of a quotient of R and Q WCT<P*ceiling(R/Q);

wherein P is a periodicity at which the BS transmits the SSBs;

wherein R is the number of receive beams switched by the UE; and wherein Q is the number of the two or more of the receive beams used to receive the corresponding two or more mutually exclusive sets each having at least one but less than all of the OFDM symbols of the SSB.

15. The UE of claim 13, wherein the receive beams are switched in time such that each of the OFDM symbols of the SSB is received by a different one of the receive beams.

16. The UE of claim 13, wherein the receive beams are switched in time such that one of the receive beams receives two OFDM symbols of the SSB and a different one of the receive beams receives two different OFDM symbols of the SSB.

17. The UE of claim 13, wherein the receive beams are switched in time such that one of the receive beams receives one OFDM symbol of the SSB and a different one of the receive beams receives three OFDM symbols of the SSB.

18. The UE of claim 13, wherein a first of the OFDM symbols of the SSB comprises a primary synchronization signal (PSS), a third of the OFDM symbols comprises a secondary synchronization signal (SSS), and a second, fourth and the third of the OFDM symbols comprise physical broadcast channel (PBCH) quadrature phase shift keying (QPSK) symbols and demodulation reference signals (DM-RS), and wherein the first and third of the OFDM symbols comprises empty resource elements; and wherein to measure the signal quality, the processor performs one or more of the following:

measures the signal quality by using the PSS;

measures the signal quality by using the SSS;

estimates the signal quality by using one or more of the DM-RS;

estimates the signal quality by equalizing and using the QPSK symbols; and measures noise plus interference power on one or more of the empty resource elements.

19. The UE of claim 13, wherein the processor is further programmed to performing timing synchronization to obtain boundaries of the OFDM symbols transmitted by the BS prior to switching the receive beams.

20. The UE of claim 13, wherein to measure the signal quality, the processor measures one or more of the following:

a reference signal received power (RSRP);

a signal-to-interference-plus-noise ratio (SINR);

a received signal strength indicator (RSSI); and a reference signal received quality (RSRQ).

21. The UE of claim 13, wherein to measure the signal quality, the processor compensates for OFDM symbols transmitted by the BS with different power from the other OFDM symbols in each SSB.

22. The UE of claim 13, wherein the receive beams are also formed to receive physical downlink control channel (PDCCH) Type 0 instances transmitted by the BS, wherein each of the PDCCH Type 0 instances comprises an OFDM symbol, wherein each of the PDCCH Type 0 instances includes an index that corresponds to the index of one of the SSBs;

wherein the receive beams are switched in time such that, for each of the SSBs and corresponding PDCCH Type 0 instances, two or more of the receive beams are used to receive corresponding two or more mutually exclusive sets each having at least one but less than all of the OFDM symbols of the SSB and the corresponding PDCCH Type 0 instance; and wherein for each receive beam/SSB index pair, the processor is programmed to measure the signal quality based on the at least one but less than all of the OFDM symbols of the indexed SSB and the correspondingly indexed PDCCH Type 0 instance received by the receive beam of the pair.

23. The UE of claim 22, wherein each of the PDCCH Type 0 instances includes demodulation reference signals (DM-RS) for PDCCH; and wherein to measure the signal quality of the OFDM symbol of each PDCCH Type 0 instance, the processor estimates the signal quality by using one or more of the DM-RS.

24. The UE of claim 13,
wherein the processor is programmed to indicate to the BS the SSB index of the pair of the selected one receive beam to inform the BS that the UE prefers the BS to subsequently transmit to the UE on the transmit beam associated with the indicated SSB index.

\* \* \* \* \*

UNITED STATES PATENT AND TRADEMARK OFFICE
CERTIFICATE OF CORRECTION

PATENT NO. : 11,178,628 B2
APPLICATION NO. : 16/671101
DATED : November 16, 2021
INVENTOR(S) : Kundargi et al.

Page 1 of 1

It is certified that error appears in the above-identified patent and that said Letters Patent is hereby corrected as shown below:

On the Title Page

Item (56), under "OTHER PUBLICATIONS", in Column 2, Line 1, delete "Mediatek," and insert -- MediaTek, --, therefor.

Item (56), under "OTHER PUBLICATIONS", in Column 2, Line 3, delete "measurment" and insert -- measurement --, therefor.

In the Claims

In Column 15, Line 40, in Claim 14, delete "and Q" and insert -- and Q, --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*